US008828227B2

(12) United States Patent
Nagai et al.

(10) Patent No.: US 8,828,227 B2
(45) Date of Patent: Sep. 9, 2014

(54) METHOD FOR PRODUCING RESIN POROUS MEMBRANE WITH ADHESIVE LAYER, RESIN POROUS MEMBRANE WITH ADHESIVE LAYER, AND FILTER MEMBER

(75) Inventors: Yozo Nagai, Osaka (JP); Kouji Furuuchi, Osaka (JP); Miho Yamaguchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/442,375

(22) Filed: Apr. 9, 2012

(65) Prior Publication Data

US 2012/0193285 A1    Aug. 2, 2012

Related U.S. Application Data

(63) Continuation of application No. 12/311,674, filed as application No. PCT/JP2007/068872 on Sep. 27, 2007, now Pat. No. 8,187,511.

(30) Foreign Application Priority Data

Oct. 19, 2006 (JP) .................. 2006-284980

(51) Int. Cl.
*B01D 63/00* (2006.01)
*A61F 13/15* (2006.01)
(Continued)

(52) U.S. Cl.
CPC ........... *B01D 71/36* (2013.01); *C09J 2427/006* (2013.01); *C09J 7/0289* (2013.01); *B01D 2323/34* (2013.01); *C09J 2205/31* (2013.01); *B01D 71/26* (2013.01); *B01D 67/0034* (2013.01); *B01D 2325/08* (2013.01); *B01D 71/46* (2013.01); *C09J 7/0239* (2013.01); *B32B 3/16* (2013.01); *C09J 2201/28* (2013.01); *C09J 163/00* (2013.01); *B01D 69/10* (2013.01); *C09J 2463/00* (2013.01); *B01D 2325/22* (2013.01); *B29C 66/71* (2013.01)
USPC ................... 210/321.75; 210/483; 210/321.6; 156/155; 156/163

(58) Field of Classification Search
CPC .... B01D 71/36; B01D 2275/10; B01D 69/06; B01D 37/1284; B01D 39/14; B01D 69/12; B01D 2327/18; C02F 1/004; C02F 2201/006; C02F 1/44; B32B 2305/026
USPC .................. 210/500.27, 490, 500.36, 321.75, 210/321.6, 483; 156/101, 102, 155, 275.3, 156/275.7, 272.2; 422/101; 427/558; 381/386; 263/139
See application file for complete search history.

(56) References Cited

U.S. PATENT DOCUMENTS 4,692,369 A    9/1987 Nomi
5,310,581 A    5/1994 Schmidt et al.
(Continued)

FOREIGN PATENT DOCUMENTS

CN    1355940    6/2002
DE    103 58 264    7/2005
(Continued)

OTHER PUBLICATIONS

The Adhesion Society of Japan, Secchaku Handbook, third edition, first print, The Nikkan Kogyo Shimbun Ltd., pp. 831-842, Jun. 28, 1996 with full English translation.

*Primary Examiner* — Ana Fortuna
(74) *Attorney, Agent, or Firm* — Hamre, Schumann, Mueller & Larson, P.C.

(57) ABSTRACT

The present invention provides a resin porous membrane with an adhesive layer that exhibits excellent bonding precision and can be bonded to an adherend while maintaining the gas permeability of the porous membrane even when the porous membrane is small, and a method for producing the resin porous membrane with the adhesive layer. The present invention also provides the filter member including the resin porous membrane with the adhesive layer.

9 Claims, 9 Drawing Sheets

(51) Int. Cl.
*C09J 7/02* (2006.01)
*B01D 71/26* (2006.01)
*B01D 67/00* (2006.01)
*B01D 71/46* (2006.01)
*B32B 3/16* (2006.01)
*C09J 163/00* (2006.01)
*B01D 69/10* (2006.01)
*B01D 71/36* (2006.01)
*B29C 65/00* (2006.01)

(56) References Cited

U.S. PATENT DOCUMENTS

| | | | |
|---|---|---|---|
| 5,543,266 A | 8/1996 | Noguchi et al. | |
| 5,653,699 A * | 8/1997 | Reed et al. | 604/307 |
| 5,772,831 A * | 6/1998 | Moro et al. | 156/309.3 |
| 6,132,869 A | 10/2000 | Ohira et al. | |
| 6,221,484 B1 | 4/2001 | Leiter | |
| 6,512,834 B1 | 1/2003 | Banter et al. | |
| 6,746,803 B1 | 6/2004 | Bauer et al. | |
| 6,875,553 B2 | 4/2005 | Daniel et al. | |
| 7,211,165 B2 | 5/2007 | Fisher | |
| 7,763,140 B2 | 7/2010 | Fisher | |
| 7,776,214 B2 * | 8/2010 | Saito et al. | 210/231 |
| 8,187,511 B2 * | 5/2012 | Nagai et al. | 264/139 |
| 2001/0042710 A1 * | 11/2001 | Clark et al. | 210/459 |
| 2003/0020178 A1 | 1/2003 | Ohashi et al. | |
| 2004/0023017 A1 * | 2/2004 | Nagoya et al. | 428/310.5 |
| 2004/0226886 A1 * | 11/2004 | Hester et al. | 210/649 |

FOREIGN PATENT DOCUMENTS

| | | | |
|---|---|---|---|
| EP | 0 012 542 | | 6/1980 |
| EP | 1366804 | * | 3/2003 |
| JP | 61-137739 | | 6/1986 |
| JP | 63-183247 | | 11/1988 |
| JP | 2003-003134 | | 1/2003 |
| JP | 2003-503991 | | 1/2003 |
| JP | 2004-083811 | | 3/2004 |

* cited by examiner

METHOD FOR PRODUCING RESIN POROUS MEMBRANE WITH ADHESIVE LAYER, RESIN POROUS MEMBRANE WITH ADHESIVE LAYER, AND FILTER MEMBER

CROSS-REFERENCE TO RELATED APPLICATIONS

This application is a Continuation of application Ser. No. 12/311,674, filed Apr. 8, 2009, which is a U.S. National Stage of PCT/JP2007/068872, filed Sep. 27, 2007, which applications are incorporated herein by reference.

TECHNICAL FIELD

The present invention relates to a resin porous membrane having on a surface thereof an adhesive layer, and a method for producing the resin porous membrane with the adhesive layer. The present invention also relates to a filter member including the resin porous membrane with the adhesive layer.

BACKGROUND ART

Today, resin porous membranes (hereinafter, also referred to simply as "porous membranes") are applied widely to filters. Particularly, porous membranes made of polytetrafluoroethylene (PTFE), that is, PTFE porous membranes, have excellent heat resistance, chemical stability, electrical insulation, water repellency, and oil repellency, which are characteristics derived from PTFE. When the PTFE porous membranes are used as a filtering medium of a filter, dust hardly is generated, and both a low pressure loss and a high collection efficiency can be achieved at the same time. Thus, the PTFE porous membranes are used widely for filters, such as filters for clean rooms, filters for dust catchers, and water proof gas permeable filters and sound pressure adjusting filters used in electronic devices such as cellular phones. The PTFE porous membranes increasingly have been used as the water proof gas permeable filters in particular that can transfer sound while preventing liquid from contacting a transducer (a transmitter and a receiver) of a cellular phone.

When the PTFE porous membrane is used for any of these applications, particularly for an electronic device, the porous membrane is bonded directly to a base component constituting the device, such as a housing, in many cases. When the porous membrane is bonded to the base component, it is important to ensure the gas permeability of the porous membrane.

As common conventional methods for bonding the porous membrane to the base component, there can be mentioned a method in which an adhesive material processed into a predetermined shape is disposed on a surface of the porous membrane or a surface of the base component, and a method in which the porous membrane and the base component are welded thermally to each other, although the latter is possible only when the base component is made of thermoplastic resin. For example, JP 2003-503991 T (Document 1) discloses methods for bonding a PTFE porous membrane that will be used as a water proof gas permeable filter of an electronic device, such as a microphone and a buzzer. One is a method in which a cut adhesive tape is bonded to a porous membrane, and another is a method in which a thermoplastic adhesive, a thermosetting adhesive, or a reactive curable adhesive is applied directly to the porous membrane by a technique such as screen printing, gravure printing, spray coating, and powder coating (see 0030 etc. of Document 1).

In recent years, as electronic devices have been downsized and highly integrated, the porous membranes to be bonded to their base components are required strongly to be smaller. With an intent to achieve further downsizing and higher integration of the electronic devices, it also has been required to dispose electronic parts, such as a transducer, directly on a circuit board as well as to arrange the porous membrane in such a manner that the porous membrane covers the electronic parts. That is, it also has been required to bond the porous membrane directly to the circuit board.

However, it is difficult to bond the smaller porous membrane to the base component while ensuring the gas permeability of the porous membrane by using the conventional bonding methods because they have limitations in reducing the size of the adhesive material to be disposed on the porous membrane, and in reducing the amount of the adhesive applied to the porous membrane. Moreover, the size reduction of the porous membrane, on which the adhesive material is disposed (on which the adhesive is applied), makes it difficult to handle, and lowers the precision in bonding the porous membrane to the base component. Furthermore, when the adherend is a circuit board, it is not possible to bond the porous membrane thereto by thermal welding because circuit boards usually are made of thermosetting resin.

DISCLOSURE OF INVENTION

The present invention is intended to provide a resin porous membrane with an adhesive layer that exhibits excellent bonding precision and can be bonded to the adherend while maintaining the gas permeability of the porous membrane even when the porous membrane is small in size, and to provide a method for producing the resin porous membrane. The present invention also is intended to provide a filter member including the resin porous membrane with the adhesive layer.

The method for producing the resin porous membrane with the adhesive layer (a first production method) of the present invention is a method for producing a resin porous membrane with an adhesive layer, having on a surface thereof an adhesive body as the adhesive layer. The first production method of the present invention comprises the steps of: disposing a photosensitive resin composition on the surface of the resin porous membrane; and exposing a portion of the resin composition to light, and then removing an unexposed portion of the resin composition so that the exposed portion remaining on the surface of the resin porous membrane serves as the adhesive body.

In another aspect, the method for producing the resin porous membrane with the adhesive layer (a second production method) of the present invention is a method for producing a resin porous membrane with an adhesive layer, having on a surface thereof an adhesive body as the adhesive layer. The second production method of the present invention comprises the steps of: disposing a photosensitive resin composition on a surface of a transfer substrate; exposing a portion of the resin composition to light, and then removing an unexposed portion of the resin composition; and transferring to the surface of the resin porous membrane the exposed portion remained on the surface of the substrate so that the transferred portion of the resin composition serves as the adhesive body.

In the resin porous membrane with the adhesive layer (a first porous membrane) of the present invention, the adhesive layer is disposed on the surface of the resin porous membrane, and the adhesive body obtained by exposing the photosensitive resin composition to light is disposed as the adhesive layer. The first porous membrane can be obtained by, for example, the first production method or the second production method.

In the resin porous membrane with the adhesive layer of the present invention in another aspect (a second porous membrane), the adhesive layer is disposed on the surface of the resin porous membrane, and the adhesive layer comprises the photosensitive resin composition. The second porous membrane can be obtained, for example, as an intermediate product in the first production method. By having the below-mentioned exposure treatment and development treatment, the second porous membrane becomes the resin porous membrane with the adhesive layer, having on the surface thereof the arbitrarily-shaped adhesive body as the adhesive layer. At this time, since the adhesive body is an adhesive body obtained by exposing the photosensitive resin composition to light, the resulting resin porous membrane with the adhesive layer is the first porous membrane.

The filter member of the present invention includes the resin porous membrane with the adhesive layer of the present invention.

The bonding method for the resin porous membrane of the present invention is a method for bonding the porous membrane to the adherend by bringing the porous membrane, which has on the surface thereof the adhesive body obtained by exposing the photosensitive resin composition to light, into contact with the adherend in such a manner that the adhesive body is in contact with the adherend, and by heating the contact area of the adhesive body and the adherend while keeping the adhesive body and the adherend in contact with each other so as to bond the resin porous membrane to the adherend.

The production method of the present invention makes it possible to produce the resin porous membrane with the adhesive layer that exhibits excellent bonding precision and can be bonded to the adherend while maintaining the gas permeability of the porous membrane even when the porous membrane is small, by using the method (the first production method) in which a portion of the photosensitive resin composition disposed on the surface of the resin porous membrane is exposed to light so that the portion cured by the exposure in the resin composition serves as the adhesive body, or by using the method (the second production method) in which a portion of the photosensitive resin composition disposed on the surface of the transfer substrate is exposed to light, and the portion cured by the exposure in the resin composition is transferred to the surface of the resin porous membrane so that the transferred portion of the resin composition serves as the adhesive body.

BEST MODE FOR CARRYING OUT THE INVENTION

Figure 1A:
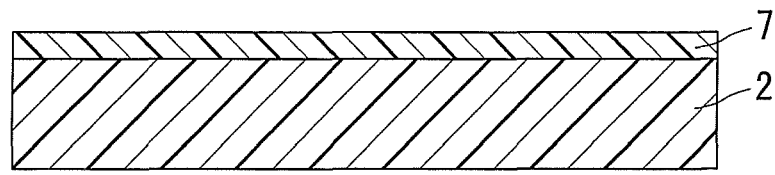
FIG. 1A is a cross-sectional view showing schematically a process in an example of the first production method of the present invention.

Embodiments of the present invention will be described with reference to the drawings. In the following description, the same members are indicated by the same reference numerals and repetitive description thereof may be omitted.

[Method for Producing the Resin Porous Membrane with the Adhesive Layer]

An example of the first production method of the present invention will be described with reference to FIG. 1A to FIG. 1D.

Figure 1B:
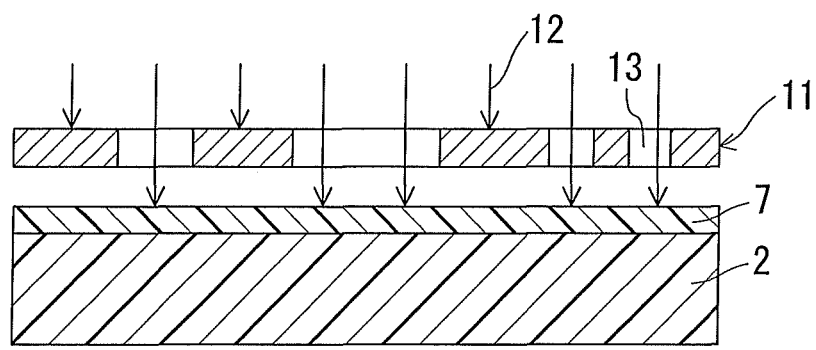
FIG. 1B is a cross-sectional view showing schematically a process following the process shown in FIG. 1A.
Figure 1C:
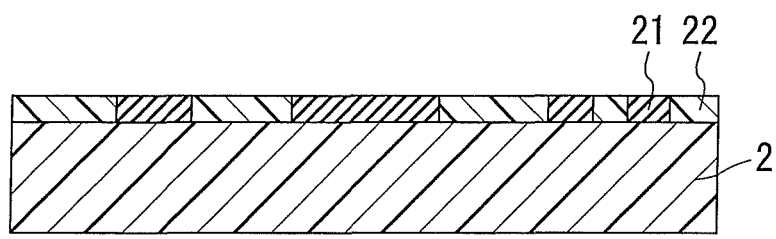
FIG. 1C is a cross-sectional view showing schematically a process following the process shown in FIG. 1B.

First, a photosensitive resin composition 7 is disposed on a surface of a resin porous membrane 2 as shown in FIG. 1A. Next, a portion of the resin composition 7 disposed on the surface of the porous membrane 2 is irradiated with a light that cures the resin composition 7, as shown in FIG. 1B, so that the irradiated portion of the resin composition 7 is cured. In the specification, irradiating the photosensitive resin composition with a light that cures the composition is expressed as "to expose to the light". The light irradiation shown in FIG. 1B also can be expressed as a portion of the composition being exposed to the light (exposure treatment). As shown in FIG. 1C, the exposure treatment allows the resin composition 7 to have exposed portions (cured portions) 21 and unexposed portions (uncured portions) 22 on the surface of the porous membrane 2.

In the example shown in FIG. 1B, a photomask 11 with opening portions 13 is disposed between a source of the light and the resin composition 7 so that the resin composition 7 is irradiated with the light passing through the opening portions 13. Accordingly, the resin composition 7 is cured in portions corresponding to the shapes of the opening portions 13. This means the cured portions 21 corresponding to the shapes of the opening portions 13 are formed.

Figure 1D:
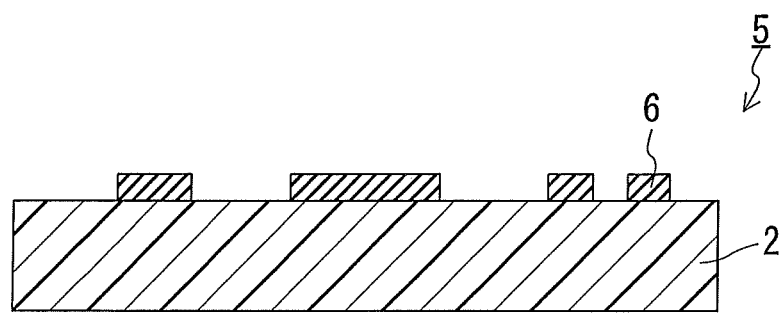
FIG. 1D is a cross-sectional view showing schematically a process following the process shown in FIG. 1C.

Next, as shown in FIG. 1D, the uncured portions 22 of the resin composition 7 are removed (development treatment), and the cured portions 21 left on the surface of the porous membrane 2 serve as adhesive bodies 6. Thus, a resin porous membrane with an adhesive layer (a first porous membrane) 5 having the adhesive bodies as the adhesive layer can be obtained.

An example of the second production method of the present invention will be described with reference to FIG. 2A to FIG. 2F.

Figure 2A:
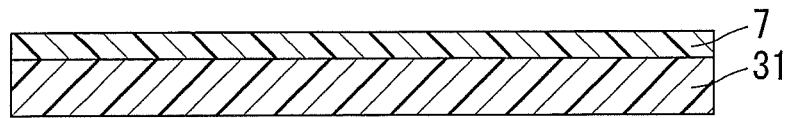
FIG. 2A is a cross-sectional view showing schematically a process in an example of the second production method of the present invention.
Figure 2B:
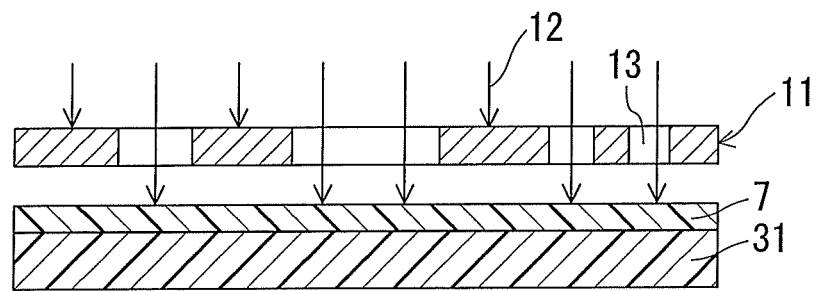
FIG. 2B is a cross-sectional view showing schematically a process following the process shown in FIG. 2A.
Figure 2C:
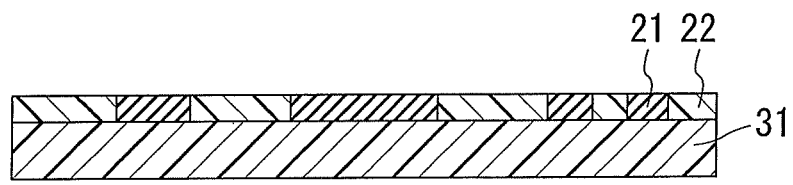
FIG. 2C is a cross-sectional view showing schematically a process following the process shown in FIG. 2B.
Figure 2D:
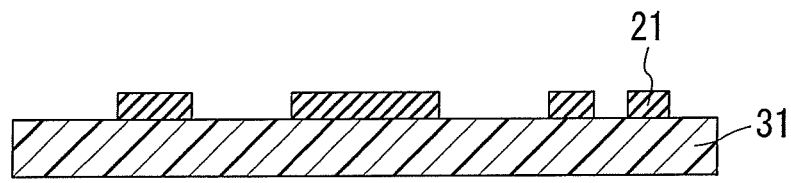
FIG. 2D is a cross-sectional view showing schematically a process following the process shown in FIG. 2C.

First, the photosensitive resin composition 7 is disposed on a surface of a transfer substrate 31 as shown in FIG. 2A. Next, a portion of the resin composition 7 disposed on the surface of the substrate 31 is irradiated with the light that cures the resin composition 7, as shown in FIG. 2B, so that the irradiated portion of the resin composition 7 is cured (exposure treatment). As shown in FIG. 2C, the exposure treatment allows the resin composition 7 to have the cured portions 21 and the uncured portions 22 on the surface of the substrate 31.

Next, the uncured portions 22 of the resin composition 7 are removed (development treatment). This treatment leaves the cured portions 21 on the surface of the substrate 31.

Figure 2E:
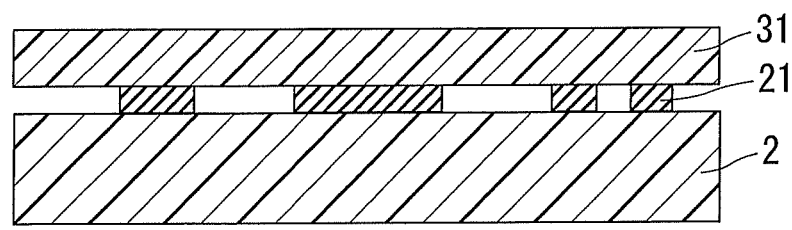
FIG. 2E is a cross-sectional view showing schematically a process following the process shown in FIG. 2D.
Figure 2F:
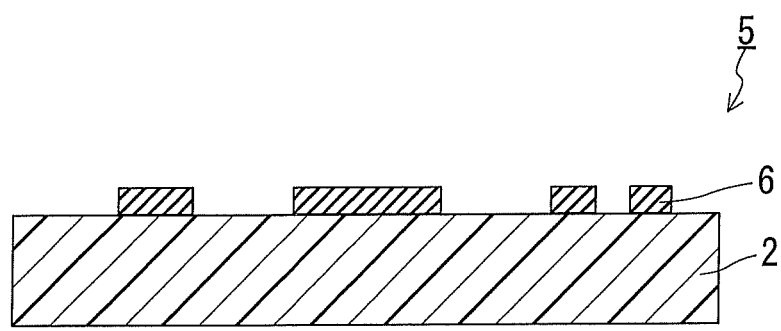
FIG. 2F is a cross-sectional view showing schematically a process following the process shown in FIG. 2E.

Subsequently, as shown in FIG. 2E, the cured portions 21 left on the surface of the substrate 31 are transferred to the surface of the porous membrane 2, and the cured portions 21 transferred to the surface of the porous membrane 2 serve as the adhesive bodies 6. Thus, the resin porous membrane with the adhesive layer (the first porous membrane) 5 can be obtained that has on the surface thereof the adhesive bodies as the adhesive layer (FIG. 2F).

The method shown in FIG. 1A to FIG. 1D and the method shown in FIG. 2A to FIG. 2F make it possible to determine arbitrarily the shape of the light applied to the photosensitive resin composition 7 by changing the shapes of the opening portions 13 of the photomask 11, and/or by controlling an optical system. That is, by applying the exposure and development treatments to the resin composition 7 disposed on the surface of the porous membrane 2 or the surface of the substrate 31, it is possible to form the first porous membrane having on the surface thereof the arbitrarily-shaped adhesive bodies 6 as the adhesive layer.

The methods also allow the adhesive bodies 6 to have a very fine shape. Specifically, the adhesive bodies 6 may have a width less than 1 mm, and 500 μm or less or 250 μm or less in some cases, and furthermore, 150 μm or less, for example. Moreover, the adhesive bodies 6 may have a strip shape with a width of 1 mm or less, and in some cases 500 μm or less or 250 μm or less, and furthermore 150 μm or less, for example. The lower limit of the width of the adhesive bodies 6 is not particularly limited, and is approximately 20 μm, for example, although it varies depending on the type of the photosensitive resin composition 7.

In the above-mentioned conventional bonding methods, a cut adhesive tape is bonded to the porous membrane, or an adhesive is applied to the porous membrane by a technique such as printing. It is difficult, however, to process the adhesive tape into a fine size to have, for example, a width of less than 1 mm because of a problem such as its adhesion to a punching die or a cutting blade. Even when a method is employed in which the adhesive is applied to the surface of the porous membrane by a technique such as printing, it is not possible to apply the adhesive to the surface of the porous membrane in such a manner that the adhesive is applied in a width of less than 1 mm because of high viscosity of the adhesive.

In contrast, the first and second production methods of the present invention make it possible to form the resin porous membrane with the adhesive layer 5 having on the surface thereof the unconventionally fine-shaped adhesive bodies 6 as the adhesive layer. The resin porous membrane with the adhesive layer thus formed is easy to handle when being bonded to the adherend even in the case where the porous membrane 2 is small. Also, the first and second production methods of the present invention allow the porous membrane 2 to ensure its gas permeability at the portions from which the photosensitive resin composition 7 has been removed by the development treatment. That is, the first and second production methods of the present invention make it possible to form the resin porous membrane with the adhesive layer that exhibits excellent bonding precision, and can be bonded to the adherend while maintaining the gas permeability of the porous membrane 2 even when the porous membrane 2 is small.

It should be noted that the "width" of the adhesive body 6 in the specification means a dimension of the adhesive body in a direction of a shorter side (or a shorter axis) thereof when viewed from a direction perpendicular to the surface of the porous membrane 2 on which the adhesive body 6 is disposed. For example, when the adhesive body is a strip-shaped body, the dimension in the shorter side direction is referred to as "width", and a dimension in a longer side direction is referred to as "length".

In the first and second production methods, the method for arranging the photosensitive resin composition on the surface of the porous membrane 2 or the surface of the substrate 31 is not particularly limited. For example, the method may be as follows. The photosensitive resin composition is dissolved in an appropriate solvent (an example thereof is an organic solvent, such as dioxane and cyclohexane) to form a solution. The solution thus formed is applied to a base film, such as a resin film, by a common coating method, such as a spin coat method. The solvent is removed by a technique, such as drying, to form a photosensitive resin layer. And then, the photosensitive resin layer thus formed is transferred from the base film to the surface of the porous membrane 2 or the surface of the substrate 31. Or the photosensitive resin composition may be disposed on the surface of the substrate 31 through applying the solution to the surface of the substrate 31 and removing the solvent.

The method for transferring the photosensitive resin layer is not particularly limited. For example, the method may be as follows. The porous membrane 2 is stacked on the base film with the photosensitive resin layer in such a manner that the photosensitive resin layer is in contact with the porous membrane 2, and pressure is applied in a direction that brings both of them into a close contact with each other. At this time, heat also may be applied, if needed.

The method for applying the exposure treatment to the resin composition 7 disposed on the surface of the porous membrane 2 or the surface of the substrate 31 is not particularly limited, and a known method (for example, a photolithography method) can be used. Examples of the light used in the exposure treatment (the light to cure the resin composition 7) include ultraviolet ray, electron ray, and microwave, although it depends on the type of the resin composition 7. The wavelength, energy, and amount of the light may be selected suitably depending on the type of the resin composition 7, desired shape and size of the adhesive body 6, etc.

Although the photomask 11 is used for the exposure treatment in the examples shown in FIG. 1B and FIG. 2B, a light shielding member other than the photomask may be used. Also, the exposure treatment on the resin composition 7 may be performed without using the shielding body such as the photomask, and may be performed, for example, only by controlling the optical system of the light to be applied, depending on the desired size and shape of the adhesive body 6. Use of the shielding body, such as the photomask, in the exposure treatment makes it possible to form on the surface of the porous membrane 2 the adhesive bodies 6 with a fine shape and/or a fine arrangement pattern.

The method for applying the development treatment to the resin composition 7 after the exposure treatment is not particularly limited, and a known method (for example, a photolithography method) can be used. More specifically, the surface of the porous membrane 2 may be washed with a solvent (a developer, such as N-methyl-2-pyrrolidone and methyl ethyl ketone) that dissolves selectively the uncured portions 22 resulting from the exposure treatment.

In the first and the second production methods, a heat treatment, such as a so-called post exposure bake (PEB) may be provided between the exposure treatment and the development treatment, if needed.

The transferring method in the second production method is not particularly limited. For example, the method may be as follows. The transfer substrate 31 is stacked on the porous membrane 2 in such a manner that the cured portions 21 left on the surface of the substrate 31 are in contact with the porous membrane 2, and pressure is applied in a direction that brings the cured portions 21 and the porous membrane 2 into a close contact with each other. At this time, heat also may be applied, if needed.

The configurations of the resin porous membrane 2, the photosensitive resin composition 7, and the transfer substrate 31 will be explained in the description about the resin porous membrane with the adhesive layer of the present invention.

[The Resin Porous Membrane with the Adhesive Layer]

Figure 3:
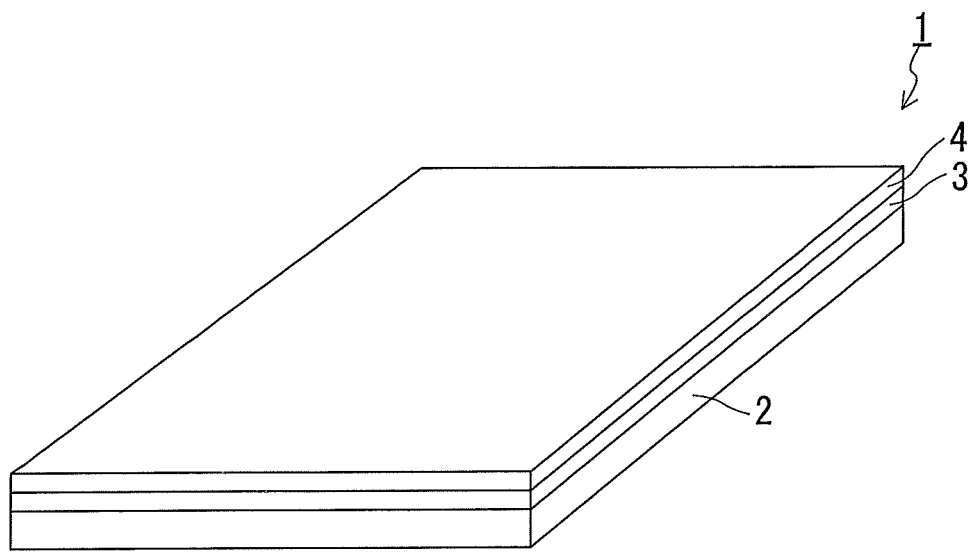
FIG. 3 is a perspective view showing an example of the second porous membrane of the present invention.

FIG. 3 shows an example of a resin porous membrane with an adhesive layer (a second porous membrane) of the present invention. A resin porous membrane with an adhesive layer 1 shown in FIG. 3 has a structure in which an adhesive layer 3 is disposed on the surface of the porous membrane 2. The adhesive layer 3 comprises the photosensitive resin composition. The adhesive layer 3 is disposed on one of the principal surfaces of the porous membrane 2 in such a manner that the adhesive layer 3 covers the principal surface entirely. A separator 4 that can be stripped off easily from the adhesive layer 3 is disposed on a principal surface of the adhesive layer 3 on a side opposite to the porous membrane 2 side.

The resin porous membrane with the adhesive layer 1 can be obtained as an intermediate product in the first production method, and can be circulated in the market as it is. For example, the laminate body shown in FIG. 1A constituted by the porous membrane 2 and the photosensitive resin composition 7 corresponds to the resin porous membrane with the adhesive layer 1.

In the resin porous membrane with the adhesive layer 1, the exposure treatment and the development treatment are applied to the adhesive layer 3 to form the adhesive body on the surface of the porous membrane 2. The adhesive body has a shape corresponding to the shape of the light applied in the exposure treatment. That is, applying the exposure treatment and the development treatment to the adhesive layer 3 makes it possible to form the resin porous membrane with the adhesive layer (the first porous membrane) 5. The adhesive body obtained by exposing the photosensitive resin composition to the light is disposed on the surface of the porous membrane as the adhesive layer.

The thickness of the adhesive layer 3 is not particularly limited. Usually, it is approximately 10 μm to 100 μm in order to perform the exposure treatment and the development treatment in a more reliable manner, and preferably 15 μm to 50 μm.

In the resin porous membrane with the adhesive layer 1 shown in FIG. 3, the adhesive layer 3 is disposed on one of the principal surfaces of the porous membrane 2 in such a manner that the adhesive layer 3 covers the principal surface entirely. However, the adhesive layer 3 does not necessarily have to be disposed like this, and it may be disposed on the surface of the porous membrane 2 in such a manner that it covers the surface partially. For example, the porous membrane 2 may have, at a periphery thereof, a portion at which the adhesive layer 3 is not disposed.

Although the resin porous membrane with the adhesive layer 1 shown in FIG. 3 includes the separator 4, the separator 4 may be provided on an if-needed basis. Providing the separator 4 to the resin porous membrane with the adhesive layer 1 makes it easier to handle the resin porous membrane with the adhesive layer 1, and promotes the circulation of the resin porous membrane with the adhesive layer 1 in the market.

When the resin porous membrane with the adhesive layer 1 includes the separator 4, the separator 4 preferably has high transparency to the light that is applied to the adhesive layer 3 in the exposure treatment. In this case, the exposure treatment can be applied while the separator 4 is present.

Typically, the separator 4 is made of resin.

The resin porous membrane with the adhesive layer 1 can be formed by providing the photosensitive resin composition on the surface of the porous membrane 2. The method for providing the photosensitive resin composition complies with the method for providing the photosensitive resin composition on the surface of the porous membrane 2 in the first and the second production methods. In this method, after the photosensitive resin layer is transferred to the porous membrane, the base film used may not be stripped off but remain as it is to serve as the separator 4, depending on the type of the base film.

Figure 4:
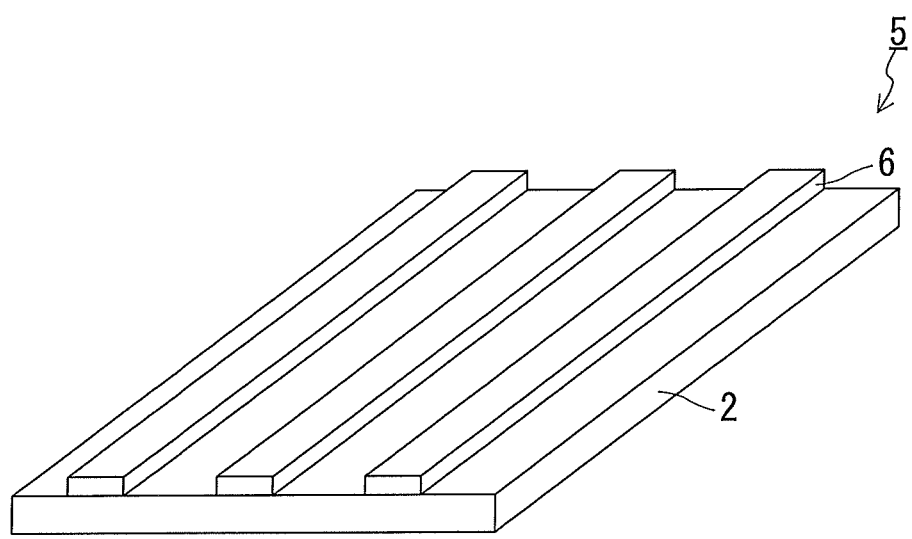
FIG. 4 is a perspective view showing an example of the first porous membrane of the present invention.

FIG. 4 shows an example of the resin porous membrane with the adhesive layer (the first porous membrane) of the present invention. The resin porous membrane with the adhesive layer 5 shown in FIG. 4 has a structure in which the adhesive bodies 6 obtained by exposing the photosensitive resin composition to the light are disposed on the surface of the porous membrane 2 as the adhesive layer. In the resin porous membrane with the adhesive layer 5 shown in FIG. 4, the adhesive bodies 6 are strip-shaped bodies extending in one direction on the principal surface of the porous membrane 2. Two or more of the adhesive bodies 6 are disposed on the surface of the porous membrane 2 in such a manner that they are parallel to each other (in a stripe pattern).

The resin porous membrane with the adhesive layer 5 can be formed, for example, by the first and the second production methods, or by applying the exposure treatment and the development treatment to the first porous membrane 1.

As described above, the adhesive bodies 6 thus formed can have a fine shape. For example, the adhesive bodies 6 may have a width less than 1 mm, and in some cases 500 μm or less or 250 μm or less, and furthermore 150 μm or less. Even when the porous membrane 2 is small, the resin porous membrane with the adhesive layer 5 having on the surface thereof the fine-shaped adhesive bodies 6 is easy to handle when being bonded to the adherend, and allows the porous membrane 2 to ensure its gas permeability at the portions where the adhesive bodies 6 are not present. This means that even when the porous membrane 2 is small, the resin porous membrane with the adhesive layer 5 has an excellent bonding precision, and can be bonded to the adherend while maintaining the gas permeability of the porous membrane 2.

Figure 5:
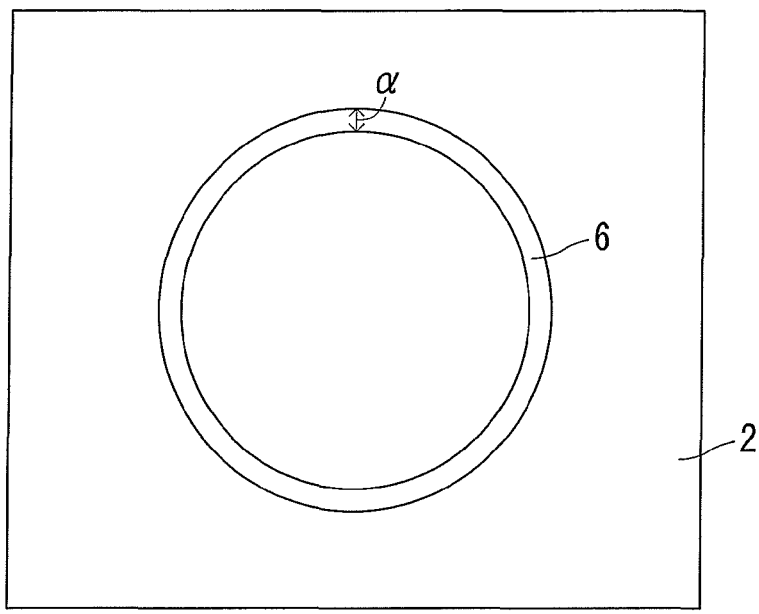
FIG. 5 is a plan view showing an example of the shape and arrangement pattern of the adhesive bodies in the first porous membrane of the present invention.
Figure 6:
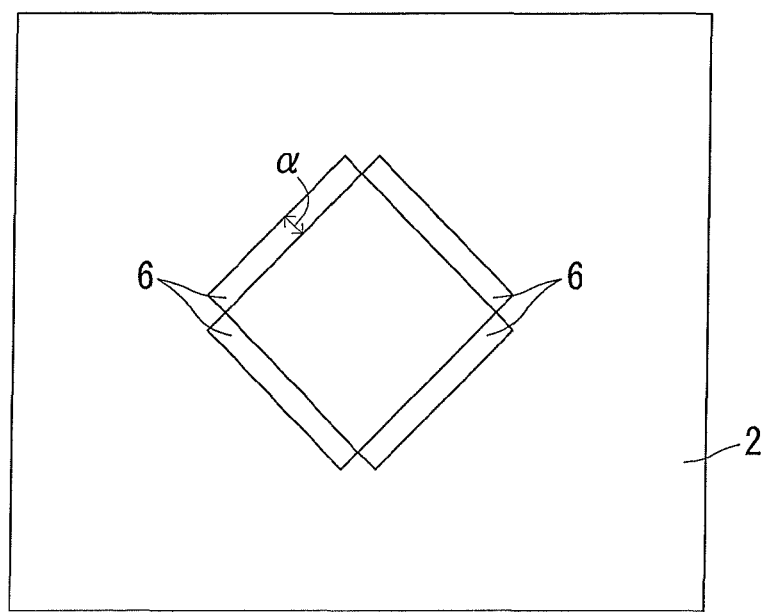
FIG. 6 is a plan view showing an example of the shape and arrangement pattern of the adhesive bodies in the first porous membrane of the present invention.
Figure 7:
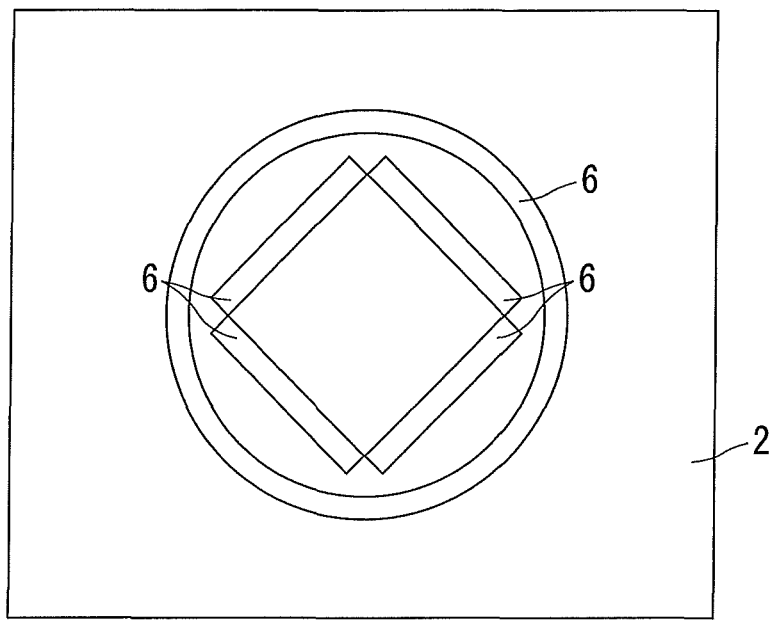
FIG. 7 is a plan view showing an example of the shape and arrangement pattern of the adhesive bodies in the first porous membrane of the present invention.

In the resin porous membrane with the adhesive layer 5 shown in FIG. 4, two or more of the adhesive bodies 6 are disposed on the surface of the porous membrane 2 in a stripe pattern. However, the shape, quantity, and arrangement pattern etc. of the adhesive bodies 6 are not particularly limited. For example, the single, annular adhesive body 6 may be disposed on the surface of the porous membrane 2 (FIG. 5), or two or more of the rectangular adhesive bodies 6 may be disposed on the surface of the porous membrane 2 (FIG. 6) in such a manner that the adhesive bodies constitute each side of one rectangle, respectively, when viewed from a direction perpendicular to the surface of the porous membrane 2 on which the adhesive bodies 6 are disposed. As a further example, the rectangular adhesive bodies 6 and the annular adhesive body 6 may be disposed in combination on the surface of the porous membrane 2 (FIG. 7). It can be said that all of the annular and rectangular adhesive bodies 6 shown in FIGS. 5 to 7 are strip-shaped bodies. The width ($\alpha$ shown in FIGS. 5 and 6) of the resin porous membrane with the adhesive layer 5 can be set to less than 1 mm, and in some cases 500 μm or less or 250 μm or less, and furthermore 150 μm or less.

Figure 8:
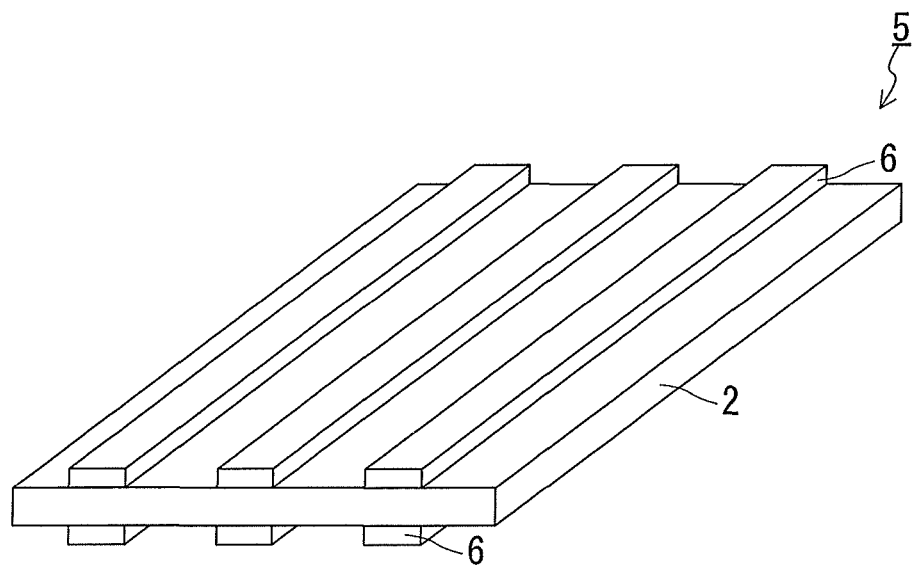
FIG. 8 is a perspective view showing an example of the first porous membrane of the present invention.

In the resin porous membrane with the adhesive layer 5, the adhesive bodies 6 may be disposed on both of the principal surfaces of the porous membrane 2 as shown in FIG. 8. In this case, the shape, quantity, and arrangement pattern of the adhesive bodies 6 disposed on one of the principal surfaces and those of the adhesive bodies 6 disposed on the other principal surface may be the same or different.

The precision in bonding the resin porous membrane with the adhesive layer 5 to the adherend can be enhanced further by selecting the shape and/or the arrangement pattern of the adhesive bodies 6 according to the material and the shape of the adhesion surface of the adherend to which the resin porous membrane with the adhesive layer 5 is bonded.

In the resin porous membrane with the adhesive layer 5, the arrangement pattern of the adhesive layer can be more intricate than that in conventional methods in which an adhesive tape is disposed on or an adhesive is applied to the surface of the porous membrane.

The type of the photosensitive resin composition is not particularly limited, and may be an epoxy resin composition, for example. Examples of the epoxy resin composition include a resin composition comprising an epoxy resin, and a substance that accelerates curing of the epoxy resin under light irradiation, such as a photoacid generator.

More specifically, the photosensitive resin composition preferably is a resin composition (a resin composition (C)) comprising a polyfunctional epoxy resin (A) having an epoxy equivalent of 100 g/eq to 300 g/eq, and a polyfunctional epoxy resin (B) having an epoxy equivalent of 450 g/eq to 10000 g/eq, and a photoacid generator. Use of the resin composition (C) makes it possible to form stably the adhesive bodies 6 having an arbitrary shape and/or an arrangement pattern by the exposure treatment and the development treatment. Furthermore, heating the formed adhesive bodies 6 makes it possible to attain high, stable adhesiveness. The reason is not clear why the resin composition (C) exerts such effects. Presumably, it is because the resin (A) with a relatively small epoxy equivalent has high wettability and flowability when being heated and maintains them even after being exposed to the light, and because the resin (B) with a relatively large epoxy equivalent has morphological stability during the exposure treatment.

The type of the resin (A) is not particularly limited as long as it is a polyfunctional epoxy resin whose epoxy equivalent is in the range of 100 g/eq to 300 g/eq. A glycidyl ether epoxy resin is preferable, and particularly, a glycidyl ether epoxy resin of bisphenol A type, bisphenol F type, biphenyl type, novolak type, or fluorene type can be used suitably.

The type of the resin (B) is not particularly limited as long as it is a polyfunctional epoxy resin whose epoxy equivalent is in the range of 450 g/eq to 10000 g/eq. For example, a bisphenol A type phenoxy resin or a bisphenol F type phenoxy resin can be used suitably. "Phenoxy resin" is an epoxy resin with an increased molecular weight, obtained by allowing epichlorohydrin to react with bisphenol A or bisphenol F.

The amounts of the resin (A) and the resin (B) comprised in the resin composition (C) are not particularly limited. Usually, the amount of the resin (A) is approximately 5 to 90 parts by weight (preferably 10 to 60 parts by weight), and the amount of the resin (B) is approximately 10 to 95 parts by weight (preferably 40 to 90 parts by weight), when the weight of the entire epoxy resin comprised in the resin composition (C) is taken as 100 parts by weight. When the amount of the resin (A) is excessively large in the resin composition (C), or when the amount of the resin (B) is excessively large in the resin composition (C), there may arise a case where it is difficult to form the adhesive bodies 6 into fine shapes by the exposure treatment and the development treatment, and where the adhesiveness of the adhesive bodies 6 is deteriorated, depending on the epoxy equivalent of the resin (A) and the resin (B).

The type of the photoacid generator is not particularly limited as long as it generates acid when being irradiated with light, and the generated acid accelerates curing of the epoxy resin. For example, a triaryl sulfonium salt, a diaryl iodonium salt, etc. for which various onium salts, particularly, $BF_4$, $PF_6$, $AsF_6$, $SbF_6$, serve as a counter anion may be used as the photoacid generator.

Usually, approximately 1 to 15 parts by weight (preferably 1 to 10 parts by weight) of the photoacid generator is included in the photosensitive resin composition with respect to 100 parts by weight of the epoxy resin.

The photosensitive resin composition such as the resin composition (C) may comprise, as needed, various kinds of additives such as a flame retardant, a release agent, and a leveling agent, that conventionally have been added to photosensitive resin compositions in some cases.

When the photosensitive resin composition is an epoxy resin composition, the ratio of unreacted epoxy in the composition after the exposition treatment is completed (that is, the ratio of unreacted epoxy in the adhesive body 6 obtained by exposing the epoxy resin composition to the light) preferably is in the range of 15% to 60%, and more preferably in the range of 20% to 50%. The unreacted epoxy ratio of less than 15% may deteriorate the adhesiveness of the adhesive bodies 6, depending on the specific composition of the epoxy resin composition. On the other hand, the unreacted epoxy ratio exceeding 60% may deteriorate the shape retentivity of the adhesive bodies 6.

The unreacted epoxy ratio can be measured, for example, on a film-like measurement specimen by conducting an FT-IR (Fourier transform infrared spectroscopy) analysis using an ATR method (attenuated total reflectance method). Specifically, when a peak due to a benzene ring appearing at around a wavelength of $1600\,\text{cm}^{-1}$ is taken as a reference peak, a peak due to epoxy unit is measured at around a wavelength of 910 $\text{cm}^{-1}$ before the exposure and after the exposure (after the heat treatment when the heat treatment such as a post exposure bake (PEB) is performed between the exposure treatment and the development treatment) so as to calculate a ratio of a peak height h2 after the exposure to a peak height h1 before the exposure by (h2/h1)×100(%). This ratio can be used as the unreacted epoxy ratio. When the epoxy resin composition is free from substances containing a benzene ring, the reference peak is measured on a reference substance containing a benzene ring.

The configuration of the resin porous membrane 2 is not particularly limited. In order to be used for various kinds of filters such as a water proof gas permeable filter, the resin porous membrane 2 comprises preferably at least one selected from a fluororesin porous body and a polyolefin porous body.

As the fluororesin porous body, there can be mentioned, for example, a porous body composed of a material such as polytetrafluoroethylene (PTFE), a tetrafluoroethylene-hexafluoropropylene copolymer (FEP), a tetrafluoroethylene-perfluoroalkyl vinyl ether copolymer (PFA), and a tetrafluoroethylene-ethylene copolymer (ETFE).

As the polyolefin porous body, there can be mentioned, for example, a porous body composed of a polymer or a copolymer of various kinds of olefin monomers, such as ethylene, propylene, 4-methylpentene-1,1-butene.

Particularly, it is preferable for the porous membrane 2 to comprise the PTFE porous body that exhibits satisfactory gas permeability even in a small ventilation area and can suppress permeation of liquid.

PTFE has an excellent heat-resistance property. Thus, the porous membrane 2 comprising the PTFE porous body allows a circuit board of an electronic device to have a reflow soldering after the resin porous membrane with the adhesive layer comprising the porous membrane 2 is bonded to the circuit board.

When the porous membrane 2 is designed to suppress the liquid permeation and to allow gas to permeate therethrough by, for example, comprising the PTFE porous body, the resin porous membrane with the adhesive layer comprising the porous membrane 2 is applied suitably to water proof gas permeable filters used for electronic devices such as cellular phones.

The porous membrane 2 may comprise a reinforcing layer made of nonwoven fabric, woven fabric, etc., if needed. To the surface of the reinforcing layer, various kinds of surface treatments, such as a water-repellent treatment, an oil-repellent treatment, and an antibacterial treatment, may be applied.

In order to bond the resin porous membrane with the adhesive layer 5 to the adherend, such as a housing of an electronic device, and various kinds of base components such as a circuit board (that is, in order to bond the porous membrane 2 to the adherend via the adhesive bodies 6), the resin porous membrane with the adhesive layer 5 is brought into contact with the adherend in such a manner that the adhesive bodies 6 are in contact with the adherend, and the contact areas of the adhesive bodies 6 and the adherend are heated while the adhesive bodies 6 and the adherend are kept in contact with each other. At this time, pressure may be applied, as needed, in a direction that brings the porous membrane with the adhesive layer 5 into close contact with the adherend, while their contact areas are heated.

The heating temperature is not particularly limited. For example, when the photosensitive resin composition is the resin composition (C), the contact areas may be heated at approximately 20° C. to 200° C., preferably at approximately 100° C. to 160° C.

The heating method is not particularly limited. For example, the contact areas may be heated from the porous membrane 2 side, or the entire unit including the adherend and the resin porous membrane with the adhesive layer 5 may be put in a heating furnace maintained at a predetermined temperature to heat the contact areas.

[Filter Member]

The configuration of the filter member of the present invention is not particularly limited as long as the filter member includes the resin porous membrane with the adhesive layer of the present invention. For example, the filter member of the present invention may include the resin porous membrane with the adhesive layer, and a support body that is made of metal or resin and supports the resin porous membrane. When the support body has gas permeability, the resin porous membrane can be stacked on the support body.

An adhesive layer of the filter member can be bonded to various kinds of adherends, such as a housing of an electronic device, a circuit board, and a support frame of a filter. In this way, the filter member of the present invention can be used for various kinds of adherends.

The filter member of the present invention can be used as various kinds of filters, such as filters for clean rooms, filters for dust catchers, and water proof gas permeable filters and sound pressure adjusting filters used in electronic devices such as cellular phones.

[Bonding Method]

Even when the porous membrane 2 is small, the bonding method of the present invention exhibits higher bonding precision than that of the conventional bonding methods, and can bond the porous membrane to the adherend while maintaining the gas permeability of the porous membrane.

In the bonding method of the present invention, the porous membrane having on the surface thereof the adhesive body may be formed by: arranging the photosensitive resin composition on the surface of the resin porous membrane; and exposing a portion of the resin composition to the light, and then removing an unexposed portion of the resin composition so that the exposed portion remained on the surface of the resin porous membrane serves as the adhesive body.

In the bonding method of the present invention, the porous membrane having on the surface thereof the adhesive body may be formed by: arranging the photosensitive resin composition on the surface of the transfer substrate; exposing a portion of the resin composition to the light, and then removing an unexposed portion of the resin composition; and transferring to the surface of the resin porous membrane the exposed portion remained on the surface of the substrate so that the transferred portion of the resin composition serves as the adhesive body.

These methods for forming the porous membrane having on the surface thereof the adhesive body comply with the first and second production methods.

Example

Hereinafter, the present invention is described in more detail with reference to the Example. The present invention is not limited to the following Example.

Example

Figure 9:
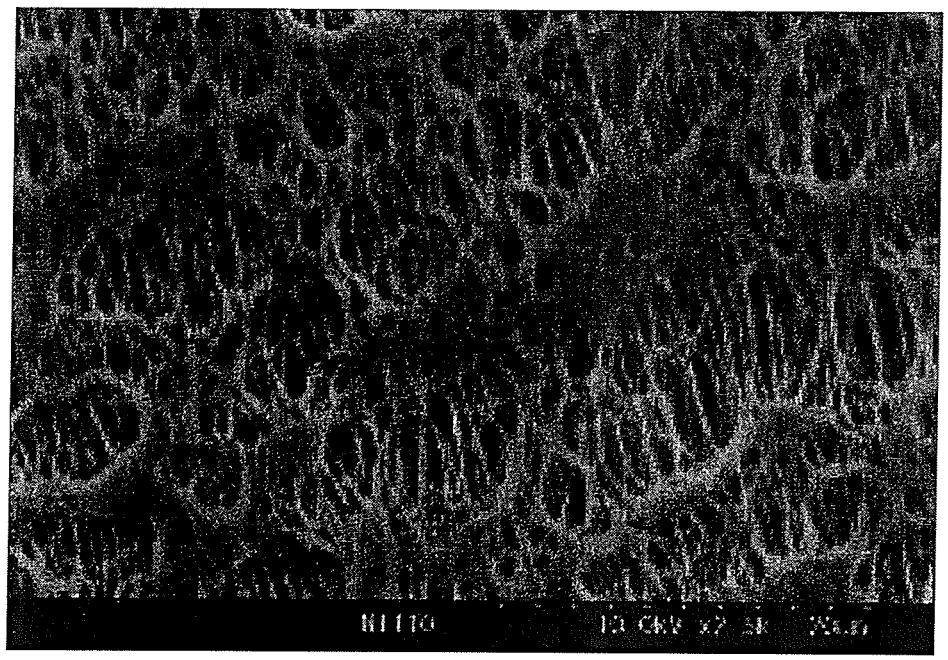
FIG. 9 is a view showing a scanning electron microscope (SEM) image of the surface of the porous membrane used in Example.

In Example, a PTFE porous body (NTF1133, produced by Nitto Denko Corp., with a thickness of 85 μm, a porosity of 82%, and a air permeability of 1 second/100 cc) was used as the porous membrane 2. The permeability shows a value obtained by a measurement according to JIS P8117 (air permeance test method—Gurley method). FIG. 9 shows an image taken when the surface of the porous membrane 2 was observed with a scanning electron microscope (SEM) (an SEM image of the surface of the porous membrane 2).

(Preparation of the Photosensitive Resin Composition)

40 parts by weight of biphenyl epoxy resin having an epoxy equivalent of 190 g/eq, which was as the resin (A), 60 parts by weight of bisphenol F type epoxy resin having an epoxy equivalent of 4500 g/eq, which was as the resin (B), and 9 parts by weight of 4,4-bis[di(β-hydroxyethoxy)phenyl-sulfinio]phenylsulfide bis(hexafluoroantimonate), which was used as the photoacid generator, were dissolved in dioxane to prepare a varnish with a solid content concentration of 50 wt %.

(Preparation of the Porous Membrane with the Adhesive Layer)

Subsequently, the varnish thus prepared was applied to a polyethylene naphthalate (PET) film, and placed and dried in a heating furnace maintained at 80° C. to form a PET film having on a surface thereof a 25 μm-thick photosensitive resin layer.

Next, the PET film with the photosensitive resin layer thus formed and the porous membrane 2 were made go through between a pair of rollers heated at 90° C. while being kept in contact with each other to transfer the photosensitive resin layer from the PET film to the surface of the porous membrane 2. Thus, the porous membrane 2 having on the surface thereof the photosensitive resin layer (the adhesive layer 3), that is, the resin porous membrane with the adhesive layer 1 (the second porous membrane), was prepared.

Next, the exposure treatment using ultraviolet ray was applied to the porous membrane with the adhesive layer 1 thus formed, using a photomask with opening portions (each having a width of 150 μm) arranged in a shape of an outline of a rectangle. A high pressure mercury vapor lamp was used as the source of the irradiation light, and the quantity of the irradiation light was set to 800 mJ/cm².

Next, the whole unit was heated at 90° C. for 10 minutes, and then the porous membrane 2 was immersed in a developer composed of N-methyl-2-pyrrolidone for 6 minutes. The porous membrane 2 was immersed further in a developer composed of methyl ethyl ketone to have the development treatment. Thus, the porous membrane 2 having on the surface thereof the adhesive bodies 6 with a shape corresponding to the shape of the opening portions of the photomask, that is, the resin porous membrane with the adhesive layer (the first porous membrane) 5, was prepared.

Figure 10A:
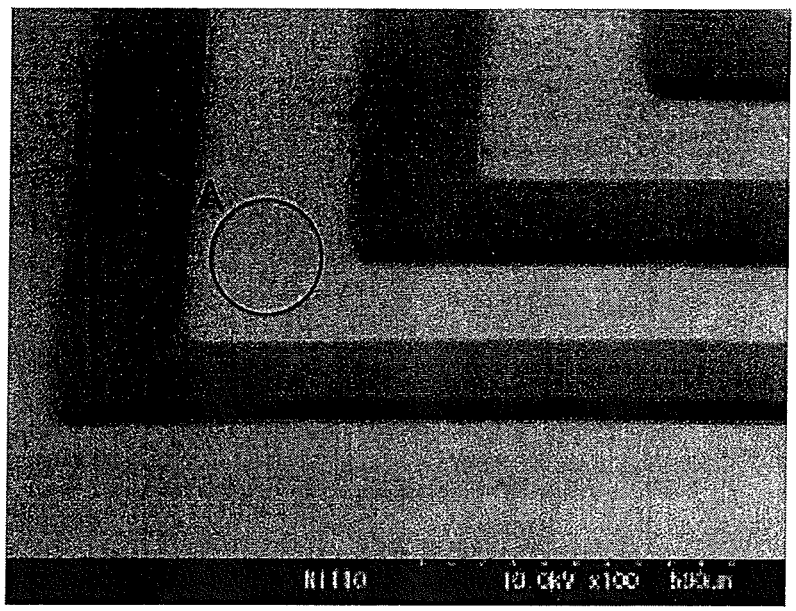
FIG. 10A is a view showing an SEM image of the surface of the first porous membrane produced in Example.

FIG. 10A shows an SEM image of the surface of the resin porous membrane with the adhesive layer 5 thus prepared. It was confirmed that, as shown in FIG. 10A, in the resin porous membrane with the adhesive layer 5, a plurality of the adhesive bodies 6 were formed on the surface of the porous membrane 2, and the adhesive bodies 6 had a width of 150 μm and were arranged in a shape of a rectangular outline corresponding to the shape of the opening portions of the photomask.

Figure 10B:
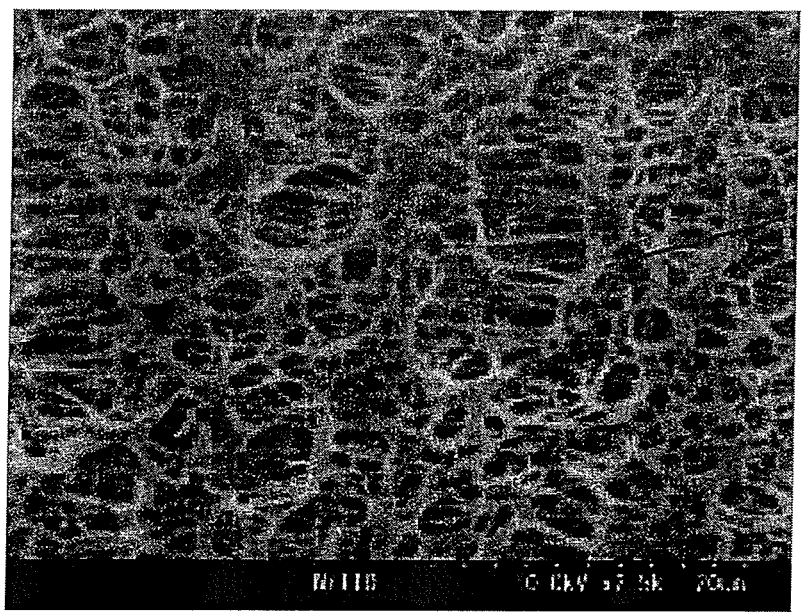
FIG. 10B is an enlarged view of Portion A on the surface of the first porous membrane shown in FIG. 10A.

FIG. 10B is an SEM image showing an enlarged view of Portion A on the surface of the porous membrane 2 in FIG. 10A. Portion A is a portion at which the photosensitive resin composition had been removed by the development treatment and the porous membrane 2 was bare. It was confirmed that, as shown in FIG. 10B, in the portion where the photosensitive resin composition had been removed by the development treatment, the pores of the porous membrane 2 were not clogged, and that the porous membrane 2 still had the surface almost the same as the surface shown in FIG. 9, which is the surface before the photosensitive resin layer was formed thereon.

(Bonding to the Adherend)

Next, the resin porous membrane with the adhesive layer 5 thus prepared was brought into contact with the adherend constituted by a glass sheet having a through hole with a diameter of 3 mm φ in such a manner that the adhesive bodies 6 and the glass sheet were in contact with each other. The whole unit was put in the heating furnace maintained at 100° C. while a pressure of 5 MPa was applied in a direction that brings the adhesive bodies 6 into close contact with the glass sheet, and the whole unit was heated for 10 seconds. The adhesive bodies 6 were brought into contact with the glass sheet in such a manner that the porous membrane 2 covered the through hole but the adhesive bodies 6 on the porous membrane 2 did not overlap with the through hole.

The bonding status between the adhesive bodies 6 and the glass sheet was checked visually after they were cooled. No deformation was observed on the adhesive bodies 6, and the porous membrane 2 was bonded to the surface of the glass sheet via the entire surfaces of the adhesive bodies 6. Also, air was blown through the through hole provided in the glass sheet. The air was able to be discharged through the porous membrane 2, and it was confirmed that the gas permeability of the porous membrane 2 was ensured.

In addition, as a reflow-soldering-proof test, the glass sheet with the porous membrane 2 bonded thereto was put for 10 seconds in the heating furnace maintained at 260° C. Separation, displacement, etc. of the porous membrane 2 from the glass sheet were not observed.

Conventional Example

A double-sided adhesive tape (a 50 μm-thick polyester film on both sides of which a 20 μm-thick thermosensitive polyacrylate adhesive was applied) was tried to be punched out into a 700 μm-wide rectangle to be used as an adhesive. However, the adhesive adhered to the punching die, making it impossible to punch out the double-sided adhesive tape into the aforementioned shape.

INDUSTRIAL APPLICABILITY

The present invention provides the resin porous membrane with the adhesive layer that exhibits excellent bonding precision and can be bonded to the adherend while maintaining the gas permeability of the porous membrane even when the porous membrane is small. The present invention also provides the filter member including the resin porous membrane with the adhesive layer.

The filter member of the present invention can be used suitably as various kinds of filters, such as filters for clean rooms, filters for dust catchers, and water proof gas permeable filters and sound pressure adjusting filters used in electronic devices such as cellular phones.

The invention claimed is:

1. A filter member, comprising:
    a resin porous membrane having an outer peripheral portion; and
    an adhesive layer that is attached to the resin porous membrane,
    wherein the adhesive layer is formed into a shape having an inner opening and a closed outer peripheral portion, and
    wherein the outer peripheral portion of the resin porous membrane is positioned at an outer side relative to the closed outer peripheral portion of the adhesive layer.

2. The filter member according to claim 1, wherein the adhesive layer is formed into a shape having a single inner opening and a closed outer peripheral portion.

3. The filter member according to claim 2, wherein the shape of the adhesive layer is single annular shape when viewed from a direction perpendicular to the surface of the resin porous membrane.

4. The filter member according to claim 2, wherein the outer peripheral portion of the resin porous member surrounds the closed outer peripheral portion of the shape when viewed from a direction perpendicular to the surface of the resin porous membrane.

5. The filter member according to claim 1, wherein the shape of the adhesive layer is a single annular shape when viewed from a direction perpendicular to the surface of the resin porous membrane.

6. The filter member according to claim 1, wherein the outer peripheral portion of the resin porous member surrounds the closed outer peripheral portion of the shape when viewed from a direction perpendicular to the surface of the resin porous membrane.

7. The filter member according to claim 1, further comprising a separator attached to the adhesive layer, wherein the resin porous membrane and the separator sandwiches the adhesive membrane, and wherein the separator covers the inner opening.

8. The filter member according to claim 1, wherein the thickness of the adhesive layer is 10 μm to 100 μm.

9. The filter member according to claim 1, wherein the resin porous membrane comprises at least one selected from a fluororesin porous body and polyolefin porous body.

\* \* \* \* \*